US012806544B2

(12) United States Patent
Koblenzer et al.

(10) Patent No.: US 12,806,544 B2
(45) Date of Patent: Nov. 24, 2026

(54) VACUUM DEGASSING PLANT AND PROCESS FOR THE INERTISATION OF PYROPHORIC POWDERS

(71) Applicant: DANIELI & C. OFFICINE MECCANICHE S.P.A., Buttrio (IT)

(72) Inventors: Harald Koblenzer, Premariacco (IT); Franco Gandin, Cranberry Township, PA (US); Stefano Terlicher, Cividale del Friuli (IT); Alessandra Primavera, Faedis (IT)

(73) Assignee: DANIELI & C. OFFICINE MECCANICHE S.P.A., Buttrio (IT)

( * ) Notice: Subject to any disclaimer, the term of this patent is extended or adjusted under 35 U.S.C. 154(b) by 307 days.

(21) Appl. No.: 18/694,133

(22) PCT Filed: Sep. 21, 2022

(86) PCT No.: PCT/IB2022/058900
§ 371 (c)(1),
(2) Date: Mar. 21, 2024

(87) PCT Pub. No.: WO2023/047287
PCT Pub. Date: Mar. 30, 2023

(65) Prior Publication Data

US 2024/0399272 A1 Dec. 5, 2024

(30) Foreign Application Priority Data

Sep. 22, 2021 (IT) ........................ 102021000024371

(51) Int. Cl.

| | |
|---|---|
| ***B01D 19/00*** | (2006.01) |
| ***B01D 46/00*** | (2022.01) |
| ***C21C 7/10*** | (2006.01) |

(52) U.S. Cl.
CPC ..... *B01D 19/0036* (2013.01); *B01D 46/0093* (2013.01); *C21C 7/10* (2013.01); *C21B 2100/44* (2017.05)

(58) Field of Classification Search
CPC .. B01D 19/0036; B01D 46/0093; C21C 7/10; C21B 2100/44
See application file for complete search history.

(56) References Cited

U.S. PATENT DOCUMENTS

| | | | |
|---|---|---|---|
| 3,514,866 | A | 6/1970 | Mcmanus et al. |
| 5,022,897 | A | 6/1991 | Balcar et al. |

FOREIGN PATENT DOCUMENTS

| | | | |
|---|---|---|---|
| CN | 1200769 | A | 12/1998 |
| EP | 0913487 | A1 | 5/1999 |

(Continued)

OTHER PUBLICATIONS

Machine translation of EP-3851545-A1 (Year: 2021).*

(Continued)

*Primary Examiner* — Robert Clemente
(74) *Attorney, Agent, or Firm* — Tutunjian & Bitetto, P.C.

(57) ABSTRACT

The invention relates to a vacuum degassing plant including a tank; and connected by a first conduit thereto a filter; and at least one vacuum pump for placing the plant under vacuum and creating a gas stream from the tank to the filter. The plant further includes a dispenser suitable for being fed with powders previously separated by the filter, wherein an outlet of the dispenser is connected to said first conduit. An inlet of the dispenser may be connected by means of a second conduit to a container collecting powders of said filter for feeding the dispenser with these powders. The invention also concerns a process wherein cold inert pow- (Continued)

ders are added to the gases removed from the tank prior to their filtration which derive at least partially from powders separated by the filtration.

20 Claims, 1 Drawing Sheet

(56) References Cited

FOREIGN PATENT DOCUMENTS

| | | | | |
|---|---|---|---|---|
| EP | 3851545 | A1 * | 7/2021 | ............... C21C 7/10 |
| GB | 192856 | A | 5/1970 | |
| JP | H08 3627 | A | 1/1996 | |
| JP | 2011038709 | A | 2/2011 | |
| RU | 2720008 | C1 | 4/2020 | |

OTHER PUBLICATIONS

International Search Report for PCT/IB2022/058900 dated Dec. 7, 2022 (4 pages).
Search Report issued in corresponding Russian Patent Application No. 2024110366/05(023384) dated Sep. 18, 2024 (2 pgs).
China Office Action and Search Report issued in corresponding Application No. CN2022800642010 dated Apr. 3, 2026 (4 pgs).

* cited by examiner

VACUUM DEGASSING PLANT AND PROCESS FOR THE INERTISATION OF PYROPHORIC POWDERS

TECHNICAL FIELD

The present invention relates to a vacuum degassing plant and process that envisages the inertisation of pyrophoric powders contained in gas streams removed from a tank placed under vacuum. Vacuum degassing (VD) treatment is used to reduce the dissolved gas content in a molten metal in order to improve its characteristics. A vacuum degassing plant generally comprises:

(a) a tank suitable, in use, to contain a ladle, connected by at least one first conduit to (b) a filter; and (c) at least one vacuum pump suitable for placing the system under vacuum and creating a gas stream from the tank through the filter.

BACKGROUND ART

In the steel industry, ladles are used to collect the molten metal that is drawn from a melting furnace, and move it to the next processing step, which can be secondary metallurgy in a ladle furnace, casting, or another intermediate step of the production process such as degassing. The molten metal once drawn into the ladle contains dissolved gases, mostly related to the melting process: for the production of some products, it is not necessary to eliminate them before casting, however for other productions it is advisable to try to remove them. For the elimination of the gases from the molten metal, a degassing process is carried out, which consists of positioning the ladles containing the molten steel inside a tank with a sealing cover cap in which a vacuum atmosphere is created, through a suitable system of pumps: for example, the ladles are exposed to a vacuum typically <1 mbar in the so-called high vacuum phase. The vacuum causes a lightening between the bonds of the molten steel molecules, so that the dissolved volatile gases tend to rise upwards and can be removed by fume extraction.

A rapid evacuation is important, as molten metal continuously cools during treatment. However, a too rapid evacuation could cause slag foaming, spraying and splashing of materials, making a controlled pumping process necessary in order to avoid extraordinary maintenances. Modern Vacuum Degassing (VD) plants based on mechanical vacuum pumps are characterized in that they develop, in more or less high percentages, powders endowed with high pyrophoricity characteristics that are sucked together with the gases removed from the tank of the degassing plant. These powders are generated in the ladle during the treatment under vacuum and may ignite by reacting upon first contact with the air. Generally, this potentially incendiary contact occurs in the sleeve filter, which is part of the final section of a fume system. In fact, the sleeves are normally made of fabric and have the purpose of filtering the residual powders contained in the fumes, which at that point of the fume system are now cold. However, the presence of oxygen contained in the air in that section can trigger exothermic reactions with the pyrophoric powders, with obvious risks for the operators and the plant during the unloading and disposal processes. The ignition of the filter has as negative consequences the damage of the filter sleeves, with the consequent shutdown of the plant and therefore loss of productivity, in addition to the costs for the replacement of the filter sleeves.

To reduce this risk, the gas, i.e., the powders contained in it, must be separated and/or diluted before entering the filter. The dilution partly neutralizes the pyrophoric capacity of the powders, so does the cooling thereof further. To obtain this effect, the state of the art proposes the addition to the gas stream of inert, cold particulate material, such as for example glass particles, before entering the filter, as described for example in U.S. Pat. Nos. 3,514,866 and 5,022,897.

SUMMARY OF THE INVENTION

The invention aims to overcome the aforesaid drawbacks and to propose a plant and an alternative vacuum degassing process that allows the cooling and the dilution of the pyrophoric powders contained in the removed gases, that is the control of the reactivity of the pyrophoric powders so that the powders are rendered harmless or the danger thereof is significantly reduced before they enter the filter to be collected, preserving their duration and also to reduce downstream of the filter their danger for transport and storage. A further object of the invention is to develop a vacuum degassing plant and process that does not require, or at least requires in a reduced amount, the addition of inert material external to the process.

Further objects or advantages of the invention will become apparent from the following disclosure.

In a first aspect of the invention, the object is achieved by a vacuum degassing plant as initially defined, wherein the vacuum degassing plant further comprises:

(d) a dispenser suitable for being fed with powders previously separated from the filter, wherein an outlet of said dispenser is connected to said first conduit connecting the tank to the filter.

The dispenser can be fed with the powders separated from the filter in a different way, for example by manually transporting the powders in special bags from the filter to the dispenser. Advantageously, the dispenser is filled automatically by drawing the powders with a pumping system from a container collecting powders of the filter and conveying them through a second conduit to an inlet of the dispenser.

In this regard, in a preferred embodiment of the invention, a dispenser inlet is connected via a second conduit to a container collecting powders of the filter to feed the dispenser with the powders separated by the filter. From the collection container, said powders may be transported, for example by means of pneumatic pressure, mechanical conveyors or other in the storage system, suitable for placing said powders in contact with the environment in order to oxidise them, before sending them to the dispensing system. Obviously, oxidation could also occur directly with oxygen or mixtures of oxygen-containing gases, such as air, which are specifically introduced into the filtered powders.

The dispenser can be of various kind, active or passive: in fact, means can be used that actively inject the inert powders, such as augers, conveyor belts, pneumatic transports, that is means that do not use moving parts such as hoppers, etc.

The use of a hopper for the introduction of the powders into the first conduit without substantial residues makes it possible to optimally exploit the effects of gravity that are combined with the suction effect performed by the first conduit to which the hopper is connected.

The fume system filter is preferably a sleeve filter, or another filter useful for the usual purpose in the sector. A periodic jet of gas injected inside the sleeves creates a violent shaking wave in order to detach and precipitate the particles deposited outside the sleeves. The powders can thus be collected in a container placed under the filter.

In an advantageous embodiment of the plant according to the invention, between tank and filter there is installed, upstream of said dispensing device, a dust collector, for example a cyclone, suitable for eliminating the coarsest particles of the powder, which ideally already undergo a first thermal abatement, precipitating in a relative collection container due to the decrease in speed once inside the dust collector. Preferably, the powders not separated by the cyclone have for at least 70% by weight a dimension of less than 1 μm. Advantageously, the unseparated powders also have for at least 15% by weight dimensions≥1 μm and ≤3 μm.

The preferred dispenser is a hopper, for the reasons explained above. Experiments have shown that for an optimal introduction of the powders from the hopper into the first gas passage conduit it is preferable that the hopper has side walls inclined at an angle <45°, preferably at an angle between 15° and 25°, most preferably at an angle of about 18°. In particular, at an angle of 18°, the best results were obtained in terms of the speed of penetration and mixing of the inert powder in the conduit together with the gases passing through it.

Advantageously, the dispenser feeds the first conduit upstream of the filter and, if present, downstream of the dust collector, preferably in a downward section of the first conduit so as to exploit the force of gravity in the delivery of the powders by the hopper. In fact, by installing the dispenser in this position, the downstream section can be exploited to facilitate the transport of the powders and the mixing of the powder introduced with the passing gas fluid. In addition, it is possible to position the top of the dispenser at the height of any galleries of the plant that allow workers the access to view the plant and also the dispenser, favouring its charging. In the case of a hopper, the powders therefore fall by gravity from the same in the conduit and are sucked by the depression present in the conduit and dragged by the downward stream of the passing fluid, clearly it is possible to adjust the stream of injected material through known dosing systems such as valves, rotocells or other. The existing vacuum degassing plants with vacuum pumps and filter can be integrated with dispensers and suction lines that charge the powders into the dispenser by simply sucking them from the suitable containers collecting powders of the filter using the appropriate pumps, regardless of the vacuum pump system that evacuates the plant.

Alternatively, the dispenser may be charged autonomously with respect to the amount of powders collected at the filter, which may also be accumulated separately for the supply of the dispenser.

Clearly, the plant may also comprise more than one filter and more than one dust collector.

Preferably, the dispenser is suitable to be operated in an inert atmosphere.

The controlled addition of inert powders to the gases or fumes exiting the tank or the dust collector, if present, of the degassing plant allows to contain the exothermic reactions that lead to combustion, making the pyrophoric powder harmless with respect to the filter, and in particular to the textile elements possibly present in the filter.

A second aspect of the invention relates to a vacuum degassing process comprising the following steps:

(I) vacuum aspiration of gases containing pyrophoric powders from a tank, in particular from a molten metal contained in said tank;
(II) addition of inert powders to the gas stream;
(III) filtration of the gas to remove the powders;

wherein the inert powders derive at least partially, preferably from one to two thirds of their amount, more preferably completely, from powders previously separated by the filtration in step (III), wherein the temperature of the inert powders is lower than the temperature of the powders sucked off in step (I), in particular lower by a factor of 0.5, more preferably the temperature of the inert powders corresponds approximately to ambient temperature, and wherein optionally said powders separated by said filtration in step (III) are further oxidized prior to their addition to the gas stream of step (II).

Where the inert powders do not entirely derive from the powders separated by the filter, they are supplemented with inert particles as described in the state of the art and well known to the skilled person, such as glass particles. In this regard, reference is made to the two US documents mentioned above.

Advantageously, prior to the addition of the inert powders, coarser particles of the powder are removed from the gas stream between step (I) and step (II), so that the powders not separated by the cyclone have for at least 70% by weight dimensions of less than 1 μm. Advantageously, the unseparated powders also have for at least 15% by weight dimensions≥1 μm and ≤3 μm.

With the advantages described above for the plant according to the invention, the addition of powders of step (II) preferably takes place in a downstream section of the gas stream.

The steps of the vacuum degassing process according to the invention are placed in particular within a vacuum degassing (VD) process as usual performed.

A typical VD treatment cycle involves an initial evacuation step, the so-called pump-down in which the pressure is brought from about 760 Torr to about 2 Torr or less. This evacuation step lasts on average from 6 to 10 min, during the pump-down step the pressure lowers and the high vacuum is achieved, i.e., preferably a vacuum≤2 Torr. Within this step the foaming takes place, a period in which there is a substantial formation of foam in the slag usually present on the molten metal in the ladle. This first step then extends from the beginning under vacuum until the desired value of Torr is reached with an average generation of powders in the fumes. In this step, generally, very little pyrophoric powder is formed (the most dangerous from the viewpoint of burning of the sleeves). Starting from a vacuum of about 200-100 Torr, it can be usually noted the formation of some particles or micro-fractions of slag due to the foaming of the slag. However, these particles already consist mostly of oxides and therefore are no longer comburent potentials, although very hot, they usually have a temperature around 1,600° C. However, a mitigation thereof with "cold" powder would make them less dangerous to effectively burn/puncture the filter sleeves. It is assumed that the amount of these powders depends on the amount of slag entering the plant and its reactivity/foaminess during the evacuation time, as well as its viscosity at the start of evacuation.

Then the main step of the process follows, the high vacuum or the deep vacuum that has an approximate duration from 20 to 30 min and is characterized by a high production of powders, wherein the greatest removal of fumes takes place. This is the step in which most of the powder is produced and is the one in which the one of most dangerous type is caused, i.e., the powder formed by sublimation of the metals (Mn, Al, Zn, Fe). It is assumed that its quantity or its stream towards the filter is in some way proportional to the amount of the argon stirring, if applied during the treatment, and inversely proportional to the amount/thickness of slag entering the VD plant. In the last 5-10 min of high vacuum the amount of powder generated is very high since the vacuum pressure, if the system losses are not excessive, should have stabilized at 0.5-1.0 Torr and therefore the driving force for the sublimation of the powder should be greater, despite the temperature of the liquid metal has decreased by about 20-40° C. compared to the beginning of the vacuum, with the effect of decreasing the driving force for the sublimation of the metals.

The third step of the overall VD process usually takes about 20 min, from the end of the vacuum to the end of the filter cleaning, the step in which the filters are cleaned. In this step there is no generation of powder, a main shut-off valve, advantageously provided in a preferred embodiment of the invention in the plant, is closed and therefore the filter is no longer connected to the tank.

The last step of the cycle generally lasts about 5 min from the end of filter cleaning to the beginning of the vacuum of the tank of a subsequent casting. In this step there is no generation of powder, a main shut-off valve, advantageously provided in a preferred embodiment of the invention in the plant, is closed and therefore the filter is no longer connected to the tank.

In a preferred embodiment of the invention, step (II), i.e., the addition of inert powders, occurs during the step of major production of pyrophoric powders during vacuum degassing, in particular at least from the last quarter of the evacuation step over half of the high vacuum step, in particular of the step of a vacuum≤2 Torr. In an exemplary embodiment of the process according to the invention, gas aspiration takes place from minute 8 to minute 26 of a complete VD treatment cycle.

To reduce the formation of particles during the evacuation period in the tank, in an embodiment of the invention, it is provided for the reduction of the slag foaminess present on the molten metal. The reduction of the foaminess can take place by methods known to the person skilled in the art, in particular by injection of an inert gas, such as nitrogen which changes the pressures in the tank. Alternatively, it is conceivable to counteract the formation of foam by entering the plant or process with a very viscous slag so that it remains "non-reactive" and viscous up to low pressures.

Preferably, the reduction of foaminess (anti-foaming measures) in the evacuation step is envisaged to be about at its half, in particular at pressures between about 30 and 50 Torr.

In a preferred embodiment of the invention, in order to determine the trend of the production of pyrophoric powders in the tank and in order to determine the ideal period and amount of inert powders to be added, before step (I) the following steps are envisaged:

- the installation of pressure meters before and after the filter (in this regard, the plant according to the invention in a preferred embodiment provides for two pressure meters, one before and one after the filter);
- the analysis of the pressure curves to assess the trend of powder production in the production cycle and calculation of the ideal inert powder intake curves,
- inert powder injection test according to the ideal curves and assessment of the impact due to the increase in powders on the filter, assessment of the resulting powder mixture and of the final level of dangerousness.

The features and advantages described for one aspect of the invention may be transferred mutatis mutandis to the other aspect of the invention.

The industrial applicability is obvious from the moment that a removal and neutralization of pyrophoric powders from a vacuum degassing plant in the metallurgical/steel sector is possible.

Said purposes and advantages will be further highlighted in the disclosure of preferred examples of embodiments of the invention given by way of non-limiting example only.

Variant and further features of the invention are the subject matter of the present application. The description of preferred embodiment examples of the plant and of the process according to the invention is given, by way of example and not of limitation, with reference to the attached drawings. In particular, unless otherwise specified, the number, shape, size and materials of the plant and of the individual components may vary, and equivalent elements may be applied without deviating from the inventive concept.

DETAILED DESCRIPTION

Figure 1:
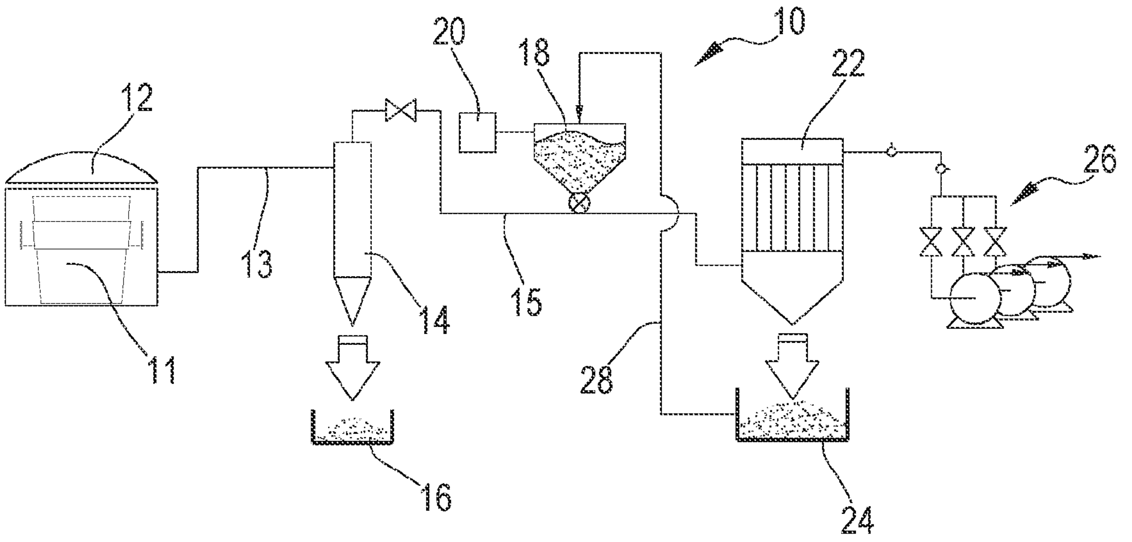
FIG. 1 depicts a simplified scheme of an embodiment of a vacuum degassing plant with the removal and neutralization of pyrophoric powders.

FIG. 1 depicts a simplified scheme of an embodiment of a vacuum degassing plant 10 with the removal and neutralization of pyrophoric powders. It can be noted on the left a tank 12 with a closable roof that houses a ladle 11 and which is connected via a conduit 13 to a separator of heavier powders 14 that are collected in a container 16. The dust separator 14 is connected via a conduit 15 to a filter 22 customary in the art for filtering the residual, finer powders that are then collected in the container 24. Advantageously, almost 75 wt % of these fine powders have dimensions of less than 1 μm, 20 wt % between 1 and 3 μm. Along the conduit 15 there is provided a dispenser 18, preferably in the form of a hopper, which contains inert particles at a temperature lower than that of the powders contained in the fumes, which can be added to the gas stream, which is removed from the tank 12 and reach through the conduits 13 and 15 the filter 22. The particles injected by the dispenser 18 mix with the powder contained in the gas, dilute it and cool down in such a way that it loses or significantly decreases the pyrophoric capacities and can be introduced into the filter 22. Downstream of the filter 22 there is a plurality of mechanical vacuum pumps 26 that place the plant under a vacuum condition to create a depression along the conduits 13 and 15 and suck the gases from the tank 12. Preferably a source of an inert gas 20, for example nitrogen, allows to manage the hopper 18 in an inert atmosphere. The hopper 18 is fed with the powders separated by the filter 22 through the conduit 28.

Figure 2:
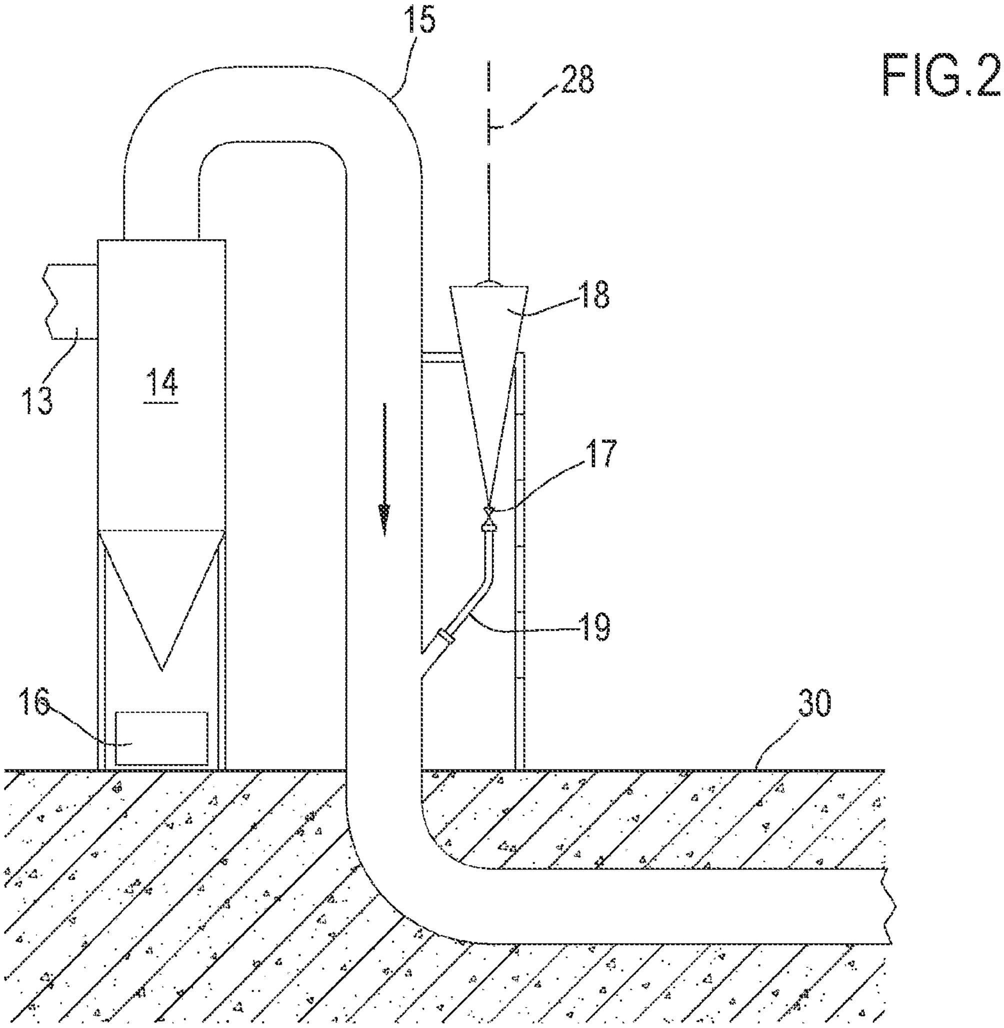
FIG. 2 depicts in detail the part of the vacuum degassing plant of FIG. 1.

FIG. 2 depicts in detail the part of the vacuum degassing plant in which the inert material is added to the conduit 15 before the filter (not depicted). The dust collector 14 is fed with a gas stream containing the powders coming from the conduit 13. The heavier powders, separated by the dust collector 14, fall into the container 16. The residual gas, still containing fine pyrophoric powders, is sucked through a conduit 15 in the direction of the arrow towards the filter (not shown). The conduit 15 preferably descends and then follow its path under the floor 30, although it is not essential to have a downward conduit, since the high speeds of the passing fumes allow a good drag and mixing of the powders. Along the descent of the conduit 15 the hopper 18 is preferably applied which is fed by the conduit 28 with powders separated by the filter (not depicted), made already inert, which in turn are added to the gas stream with fine powders through an inclined tube 19. The addition of the powders can be adjusted with a valve 17. The added powders mix with the moving gas in the line 15. It is clear that the methods of introduction can also be other, such as augers, conveyor belts, pneumatic conveyors or other, which could easily inject the inert powders at other points of the line upstream the filter 22.

Given the amount of pyrophoric powders produced by each VD treatment and given the trend of the production thereof, in an embodiment example it is envisaged discharging about 200 kg of powder for a casting of 100-125 tons homogeneously from after 5 minutes to half an hour of the degassing treatment; in particular it is envisaged discharging inert powder from the eighth minute through more discharges with a duration of 10-20 seconds every three-five minutes until the total emptying of the hopper. The discharge of the inert powders in the first conduit in variants of the invention can take place at intervals and not necessarily continuously.

A hopper for a common VD plant can have for example 180 l of useful volume, and an opening angle of 18°. As a main container for the collection of powders, a 1000-litre tank and an additional 1000-litre empty auxiliary accumulation tank can be provided to manage the collection and the storage of the powders that cannot all be reused in the plant, but must also be disposed of cyclically. Pumps suitable for pumping powders in the first conduit are liquid ring pumps, for example with a power of 5.5 kW. Advantageously, connection lines are provided for pressurizing and depressurizing the top of the hopper, therefore for balancing the pressure in the hopper beyond the suction powder charging line.

Valves suitable for managing the fluid streams along the different conduits are for example ball valves, proportional valves, rotocells, etc.

From the tests carried out, the possibility of reliably and constantly letting the powder flow over time and of interrupting and resuming the stream at will was confirmed, allowing the expected amount of inert powders to flow at the desired time and for the desired duration. Thanks to variable interruptions it is possible to create different concentration curves, to better mix the powders.

By setting equal or different pressures between tank and hopper and by applying pneumatic vibrations or not and by varying the opening degree of the valves between tank and hopper it is possible to set the emptying times of the hopper.

The invention claimed is:

1. A vacuum degassing plant comprising:

(a) a tank suitable, in use, to contain a ladle, connected by at least one first conduit to (b) a filter;

(c) at least one vacuum pump suitable for placing a system made up of the tank, the first conduit and the filter under vacuum and creating a gas stream from the tank through the filter; and (d) a dispenser suitable for being fed with powders previously separated by the filter, wherein an outlet of said dispenser is connected to said first conduit connecting the tank to the filter; and wherein an inlet of said dispenser is connected by means of a second conduit to a container collecting powders of said filter for feeding said dispenser with the powders separated by the filter.

2. The vacuum degassing plant according to claim 1, wherein said second conduit is suitable to place said powders in contact with the environment so as to make them oxidize, before sending them to the dispensing system.

3. The plant according to claim 1, wherein between the tank and the filter there is installed upstream of said dispenser a dust collector which lets pass only powders having for at least 70% by weight dimensions of less than 1 μm.

4. The plant according to claim 3, wherein said dust collector lets furthermore pass at least 15% by weight dimensions ≥1 μm and ≤3 μm.

5. The plant according to claim 1, wherein said dispenser is a hopper whose side walls are inclined at an angle <45°.

6. The plant according to claim 5, wherein the side walls are inclined at an angle between 15° and 25°.

7. The plant according to claim 1, wherein said dispenser feeds said first conduit upstream of said filter and, if present, downstream of a dust collector in a descending section of said first conduit.

8. The plant according to claim 1, wherein said dispenser is suitable to be operated in an inert atmosphere (20).

9. A vacuum degassing process comprising the following steps:

(I) vacuum aspiration of gases containing pyrophoric powders from a tank;

(II) addition of inert powders to the gas stream;

(III) filtration of the gas to remove the powders;

wherein said inert powders derive at least partially from powders previously separated by said filtration in step (III), wherein the temperature of said inert powders is lower than the temperature of said powders sucked off in step (I); and wherein optionally said powders separated by said filtration in step (III) are further oxidized prior to their addition to the gas stream of step (II).

10. The process according to claim 9 wherein between step (I) and step (II) coarser powder particles are removed from the gas stream so that in step (II) only powders having for at least 70% by weight dimensions of less than 1 μm.

11. The vacuum degassing process according to claim 10, wherein in step (II) powders having for at least 70% by weight dimensions of less than 1 μm and additionally for at least 15% by weight dimensions of ≥1 μm and ≤3 μm are available.

12. The process according to claim 9, wherein said addition of powders of step (II) occurs in a descending section of the gas stream.

13. The process according to claim 9, wherein step (II) occurs during the phase of major production of pyrophoric powders during vacuum degassing.

14. The vacuum degassing process according to claim 13, wherein step (II) occurs at least from the last quarter of the evacuation phase until half of the high vacuum phase.

15. The vacuum degassing process according to claim 14, wherein step (II) occurs in a step of vacuum≤2 Torr.

16. The process according to claim 9, wherein during the step of evacuating the tank in order to achieve the high vacuum, a reduction in the foaming of the slag present on the surface of the molten metal takes place.

17. The vacuum degassing process according to claim 9, wherein the gases containing pyrophoric powders are aspirated from a molten metal contained in said tank.

18. The vacuum degassing process according to claim 9, wherein said inert powders derive from one to two thirds of their amount from powders previously separated by said filtration in step (III).

19. The vacuum degassing process according to claim 9, wherein said inert powders derive completely from powders previously separated by said filtration in step (III).

20. The vacuum degassing process according to claim 9, wherein the temperature of said inert powders corresponds approximately to ambient temperature.

* * * * *